(12) United States Patent
Fukushima

(10) Patent No.: US 9,721,145 B2
(45) Date of Patent: Aug. 1, 2017

(54) CENTRAL PERSON DETERMINING SYSTEM, INFORMATION TERMINAL USED IN THE SAME, CENTRAL PERSON DETERMINING METHOD, AND RECORDING MEDIUM FOR CENTRAL PERSON DETERMINING PROGRAM

(71) Applicant: FUJIFILM Corporation, Tokyo (JP)

(72) Inventor: Toshimitsu Fukushima, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 139 days.

(21) Appl. No.: 14/669,656

(22) Filed: Mar. 26, 2015

(65) Prior Publication Data
US 2015/0278581 A1    Oct. 1, 2015

(30) Foreign Application Priority Data
Mar. 27, 2014    (JP) .................................. 2014-066990

(51) Int. Cl.
*G06K 9/62*    (2006.01)
*G06K 9/00*    (2006.01)

(52) U.S. Cl.
CPC ................. *G06K 9/00241* (2013.01)

(58) Field of Classification Search
CPC ............................ G06K 9/00221–2009/00328
See application file for complete search history.

(56) References Cited

U.S. PATENT DOCUMENTS

| 8,818,055 B2* | 8/2014 | Tsuji ..................... H04N 5/232 |
| | | 382/118 |
| 8,908,207 B2 | 12/2014 | Nishimaki |
| 2004/0263630 A1 | 12/2004 | Rokutanda |
| 2006/0008145 A1 | 1/2006 | Kaku |
| 2009/0135269 A1 | 5/2009 | Nozaki |

(Continued)

FOREIGN PATENT DOCUMENTS

| JP | 2001-142819 | 5/2001 |
| JP | 2005-12326 | 1/2005 |

(Continued)

OTHER PUBLICATIONS

Japanese Office Action dated Mar. 8, 2016 in corresponding Japanese Patent Application No. 2014-066990 with English machine translation of Japanese Office Action.

(Continued)

*Primary Examiner* — Brian P Werner
(74) *Attorney, Agent, or Firm* — Young & Thompson

(57) ABSTRACT

A central person determining system includes an information terminal having a plurality of image data; and a server; wherein the information terminal performs face detection processing and generates a face detection result for each of a plurality of images based on the plurality of image data, generates a plurality of face image data by cropping, on the basis of the face detection result, a face image from the plurality of images based on the plurality of image data, and transmits the plurality of face image data to the server; and wherein the server performs central person determining processing on the basis of the plurality of face image data acquired from the information terminal, generates the central person determining result, and transmits the central person determining result to the information terminal.

6 Claims, 7 Drawing Sheets

(56) References Cited

U.S. PATENT DOCUMENTS

| | | | |
|---|---|---|---|
| 2009/0141950 A1* | 6/2009 | Ryu | G06F 17/30259 |
| | | | 382/118 |
| 2011/0299114 A1 | 12/2011 | Nishimaki | |
| 2014/0250431 A1* | 9/2014 | Okamori | G06F 9/5044 |
| | | | 717/170 |
| 2015/0223043 A1* | 8/2015 | Miluzzo | H04W 4/08 |
| | | | 455/406 |

FOREIGN PATENT DOCUMENTS

| | | |
|---|---|---|
| JP | 2006-65613 | 3/2006 |
| JP | 2007-140897 | 6/2007 |
| JP | 2007-148691 A | 6/2007 |
| JP | 2007-226741 | 9/2007 |
| JP | 2008-160354 A | 7/2008 |
| JP | 2011-257799 | 12/2011 |
| JP | 2013-196174 | 9/2013 |
| JP | 2013-225256 | 10/2013 |

OTHER PUBLICATIONS

Japanese Official Action—2014-066990—Jun. 21, 2016.

\* cited by examiner

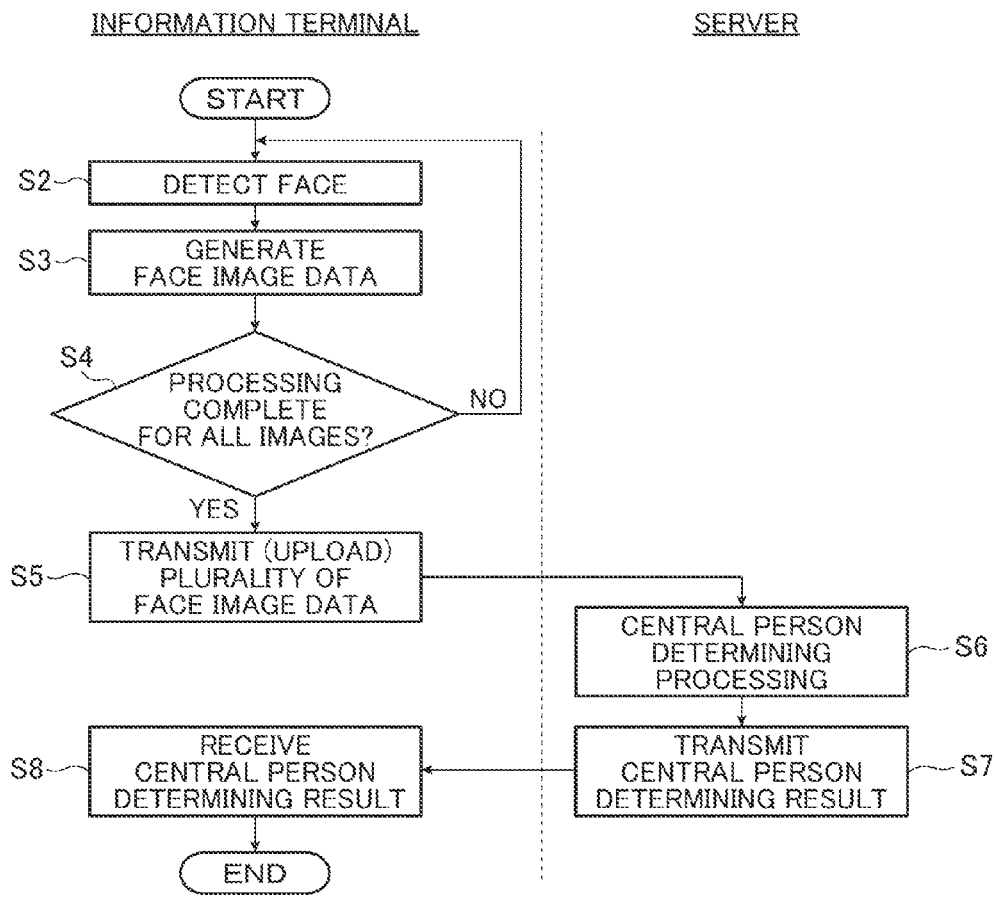
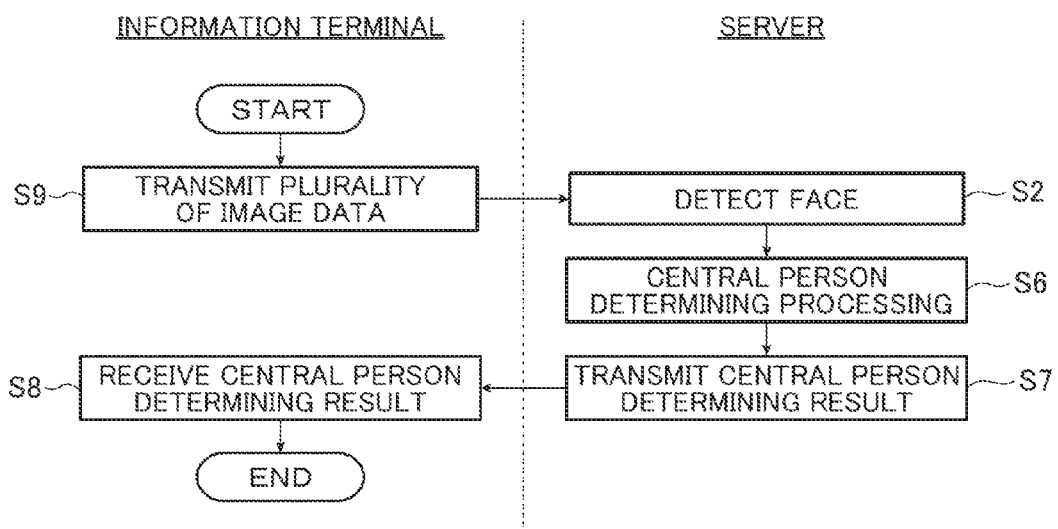

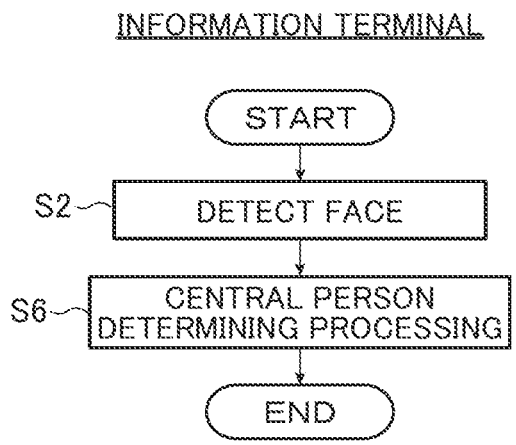
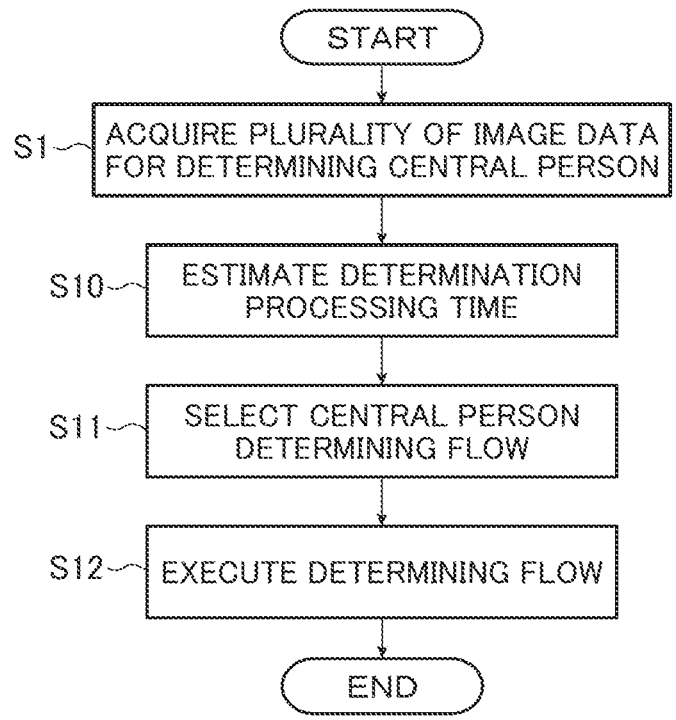

CENTRAL PERSON DETERMINING SYSTEM, INFORMATION TERMINAL USED IN THE SAME, CENTRAL PERSON DETERMINING METHOD, AND RECORDING MEDIUM FOR CENTRAL PERSON DETERMINING PROGRAM

CROSS-REFERENCE TO RELATED APPLICATIONS

The present application claims priority under 35 U.S.C. §119 to Japanese Patent Application No. 2014-066990, filed on Mar. 27, 2014. Each of the above application(s) is hereby expressly incorporated by reference, in its entirety, into the present application.

BACKGROUND OF THE INVENTION

The invention relates to a central person determining system for determining a central person that appears in an image from a plurality of image data, an information terminal that is used in the central person determining system, a central person determining method, a recording medium on which has been stored a central person determining program.

The prevalence of handheld information terminals, such as smartphones or smart tablets, has been growing rapidly in recent years, and photo books and other such image products that make use of a plurality of image data photographed using the handheld information terminals are being created.

In order to create a more appealing image product, a central person who appears in a plurality of images can be determined from the plurality of images to be used in an image product, and an image product that is based on the central person can be created, for example.

For example, JP 2007-148691 A discloses an image processor for generating face recognition data based on face feature points by detecting a face from image data, generating face image data, and extracting the face feature points.

Also, JP 2008-160354 A discloses a video output device for transmitting a video image of a face, which was obtained by selecting and extracting a face area, to a face search server upon the recognition that a face is included in a video image in the video output device, and for transmitting (link information of) information related to the person corresponding to the video image of the face to the video output device from the face search server.

SUMMARY OF THE INVENTION

A person with ordinary skill in the art will be able to utilize the image processor disclosed in JP 2007-148691 A to generate face recognition data from a plurality of image data, determine a central person by using the face recognition data, and create a photo book or other such image product based on the central person, for example.

However, the series of processes related to determining a central person (central person determining processing) is high-load processing that requires machine power, and for example, when central person determining processing is performed on a handheld information terminal that was never meant to support high-load processing, a long time is needed for processing.

Central person determining processing is ordinarily performed on a plurality of inputted image data according to a flow that includes detecting a face, calculating the face feature value (the detection of parts of the face), generating face model data, determining a central person (or determining same person) based on face model data, but the processing time required for central person determining processing will differ greatly depending on whether a series of these processes is performed on a handheld information terminal or on a server. The processing times involved in face detection, face feature value calculation, face model data generation, and central person determination (400 faces and 1500 faces) on a predetermined handheld information terminal (presumably a SAMSUNG Galaxy (registered trademark) S4 SC-04E) and a predetermined server (presumably a DELL PowerEdge (registered trademark) R420), for example, are presented in Table 1 below.

TABLE 1

| Process | Processing Time | |
|---|---|---|
| | Handheld Information Terminal | Server |
| Face Detection | 200 ms/image | 40 ms/image |
| Face Feature Value Calculation (Face Parts Detection) | 200 ms/image | 40 ms/image |
| Face Model Data Generation | 5 ms/image | 1 ms/image |
| Central Person Determination | About 400 faces: approx. 45 seconds | About 400 faces: approx. 4 seconds |
| | About 1500 faces: approx. 170 seconds | About 1500 faces: approx. 15 seconds |

That is, as shown in Table 1 above, in the case of the handheld information terminal, a processing time of 405 ms×(number of images) is required for the preliminary steps up to the determination of the central person, and in the case of the server, a processing time of 81 ms×(number of images) is required for the preliminary steps up to the determination of the central person. Upon an increase in the number of pieces of face model data in order to perform comparative processing using a combination of face model data (for example, Combination=(n×(n−1))/(2×1)) for determining the central person, an increase in the processing time of equal to or greater than the proportional relationship therebetween can occur even when attempts have been made to reduce the processing time using various well-known algorithms for reducing computational load.

Therefore, as shown in Table 2 below, the processing time required for central person determining processing performed using the above-described flow, that is, the total processing time required for the above-described series of processes in the case of 400 images (where one image equals one face) is approximately 207 seconds (405 ms×400+45 s) for the handheld information terminal, and approximately 36.4 seconds (81 ms×400+4 s) for the server. The total processing time required for the above-described series of processes in the case of 1500 images (where one image equals one face) is approximately 777.5 seconds (405 ms×1500+170 s) for the handheld information terminal, and approximately 136.5 seconds (81 ms×1500+15 s) for the server.

TABLE 2

| Number of Images (Assuming one image equals one face) | Total Processing Time | |
|---|---|---|
| | Information Terminal | Server |
| 400 images | 207 seconds | 36.4 seconds |
| 1500 images | 777.5 seconds | 136.5 seconds |

Table 2 above is an example of a simple comparison of the processing time required for central person determining processing in cases where central person determining processing was performed on a handheld information terminal and cases where central person determining processing was performed on a server, but in reality, to perform central person determining processing on a server for a plurality of image data stored on a handheld information terminal, it is necessary to transmit (upload) the plurality of image data from the handheld information terminal to the server via the internet or some other such communication network, and as such, the time required for communications processing (the communication processing time) must also be taken into account in addition to the data processing time described above.

Therefore, upon using a third-generation mobile communication system called 3G (hereinafter 3G network), for example, it will take even longer to perform central person determining processing using a handheld information terminal due to the low-speed communication environment.

JP 2008-160354 A discloses in effect that the amount of data to be sent to a face search server from the video output device can be reduced by transmitting the video image of the face obtained by selecting and extracting a face area, but this does not take into consideration a situation in which the communication environment changes greatly as with a handheld information terminal. Also, in JP 2008-160354 A, the face matching performed by the face search server is for security reasons, and the face matching being performed by the face search server does not take into account the difference in data processing speeds between the video output device and the face search server.

An object of the invention is to provide a central person determining system that is capable of solving the aforementioned problems and shortening determination processing time related to central person determining processing in a low-speed communication environment, and an information terminal used in the central person determining system, a central person determining method, and a recording medium on which has been stored a central person determining program executing the central person determining method.

Another object of the invention is to provide a central person determining system that is capable of selecting an optimum central person determining flow in accordance with the respective data processing speeds of an information terminal and a server and the communication speed between the information terminal and the server, and shortening determination processing time related to central person determining processing, and an information terminal that is used in the central person determining system, a central person determining method, and a recording medium on which has been stored a central person determining program executing the central person determining method.

In order to achieve the aforementioned object, the present invention provides a central person determining system, comprising:

an information terminal having a plurality of image data; and a server;

the information terminal including:

a face detector configured to perform face detection processing and generating a face detection result for each of a plurality of images based on the plurality of image data, a face image data generator configured to generate a plurality of face image data by cropping, on the basis of the face detection result, a face image from the plurality of images based on the plurality of image data, and a terminal data transmission reception section for transmitting the plurality of face image data to the server, and receive a central person determining result from the server; and the server including:

a central person determining processor configured to perform central person determining processing on the basis of the plurality of face image data acquired from the information terminal, and generating the central person determining result, and a server data transmission reception section configured to receive the plurality of face image data from the information terminal, and transmit the central person determining result to the information terminal.

In the central person determining system, it is preferable that the face image data generator calculates a center position of the face image and a size of the face image on the basis of the face detection result, and generates the face image data by cropping the face image on the basis of the center position of the face image and the size of the face image.

It is preferable that the face image data generator uses as a data name of the face image data at least one of a data name of an original image from which the face image is cropped, the center position of the face image, the size of the face image, and a checksum of original image data.

It is preferable that the face image data generator performs encoding such that a size of the face image data is made uniform, and a data volume of the face image data becomes equal to or less than a predetermined value.

In addition, the present invention provides a central person determining system including an information terminal having a plurality of image data, or the information terminal and a server, the central person determining system comprising:

a determination processing time estimator configured to estimate a determination processing time required for central person determining processing on the basis of the plurality of image data, in accordance with a communication speed between the information terminal and the server and respective data processing speeds of the information terminal and the server, in each of a first determining flow for performing central person determining processing by generating face image data from the plurality of image data in the information terminal and transmitting the face image data to the server and receiving a central person determining result from the server; a second determining flow for performing central person determining processing by transmitting the plurality of image data from the information terminal to the server, and receiving a central person determining result from the server; and a third determining flow for performing central person determining processing based on the plurality of image data and generating a central person determining result in the information terminal;

a flow selector for selecting, from among the first determining flow, the second determining flow, and the third determining flow, a central person determining flow having the shortest the determination processing time obtained by the determination processing time having been estimated in the determination processing time estimator; and a determining flow executing section configured to perform central person determining processing on the plurality of image data on the basis of the central person determining flow selected by the flow selector;

the determining flow executing section including:

a face detector configured to perform face detection processing for each of a plurality of images based on the plurality of image data, and outputting a face detection result; and a central person determining processor configured to perform central person determining processing on the basis of either the plurality of face image data generated on the basis of the face detection result, or the face detection result and the plurality of image data, and generating the central person determining result.

In the central person determining system, it is preferable that the determination processing time estimator performs each of the first determining flow, the second determining flow, and the third determining flow for a single piece of image data in the determining flow executing section, calculates respective determination processing actual times, and estimates the determination processing time of each flow on the basis of the calculated determination processing actual times.

Further, the present invention provides an information terminal, comprising:

a face detector configured to perform face detection processing for each of a plurality of images based on a plurality of image data, and generating a face detection result;

a face image data generator configured to generate a plurality of face image data by cropping a face image from the plurality of images based on the plurality of image data on the basis of the face detection result; and a terminal data transmission reception section for transmitting the plurality of face image data to a server, and receive a central person determining result obtained in accordance with central person determining processing performed in the server on the basis of the plurality of face image data from the server.

In the information terminal, it is preferable that the face image data generator calculates a center position of the face image and a size of the face image on the basis of the face detection result, and generates the face image data by cropping the face image on the basis of the center position of the face image and the size of the face image.

It is preferable that the face image data generator uses as a data name of the face image data at least one of a data name of an original image from which the face image is cropped, the center position of the face image, the size of the face image, and a checksum of the original image data.

It is preferable that the face image data generator performs encoding such that a size of the face image data is made uniform, and a data volume of the face image data becomes equal to or less than a predetermined value.

In addition, the present invention provides an information terminal that has a plurality of image data, comprising:

a determination processing time estimator configured to estimate a determination processing time required for central person determining processing on the basis of the plurality of image data, in accordance with a communication speed between the information terminal and a server and respective data processing speeds of the information terminal and the server, in each of a first determining flow for performing central person determining processing by generating face image data from the plurality of image data in the information terminal and transmitting the face image data to the server, and receiving a central person determining result from the server; a second determining flow for performing central person determining processing by transmitting the plurality of image data from the information terminal to the server, and receiving a central person determining result from the server; and a third determining flow for performing central person determining processing based on the plurality of image data and generating a central person determining result in the information terminal; and a flow selector for selecting, from among the first determining flow, the second determining flow, and the third determining flow, a central person determining flow having the shortest the determination processing time obtained by the determination processing time having been estimated in the determination processing time estimator.

Further, the present invention provides a central person determining method used with a server and an information terminal having a plurality of image data, comprising:

a face detecting step for generating a face detection result by performing face detection processing in the information terminal for a plurality of images based on the plurality of image data;

a face image data generating step for generating a plurality of face image data by cropping, on the basis of the face detection result, a face image from the plurality of images based on the plurality of image data;

a face image data transmitting step for transmitting the plurality of face image data to the server;

a face image data receiving step for receiving the plurality of face image data in the server from the information terminal;

a central person determining processing step for performing central person determining processing on the basis of the plurality of face image data received from the information terminal, and generating the central person determining result;

a central person determining result transmitting step for transmitting the central person determining result to the information terminal; and a central person determining result receiving step for receiving the central person determining result in the information terminal from the server.

In the central person determining method, it is preferable that the face image data generating step calculates a center position of the face image and a size of the face image on the basis of the face detection result, and generates the face image data by cropping the face image on the basis of the center position of the face image and the size of the face image.

It is preferable that the face image data generating step uses at least one of a data name of an original image from which the face image is cropped, the center position of the face image, the size of the face image, and a checksum of original image data as a data name of the face image data.

It is preferable that the face image data generating step performs encoding such that a size of the face image data is made uniform, and a data volume of the face image data becomes equal to or less than a predetermined value.

In addition, the present invention provides a central person determining method used with an information terminal that has a plurality of image data, or with the information terminal and a server, comprising:

a determination processing time estimating step for estimating a determination processing time required for central person determining processing on the basis of the plurality of image data, in accordance with a communication speed between the information terminal and the server and respective data processing speeds of the information terminal and the server in the information terminal, in each of a first determining flow for performing central person determining processing by generating face image data from the plurality of image data in the information terminal and transmitting the face image data to the server and receiving a central person determining result from the server; a second determining flow for performing central person determining processing by transmitting the plurality of image data from the information terminal to the server, and receiving a central person determining result from the server; and a third determining flow for performing central person determining processing based on the plurality of image data and generating a central person determining result in the information terminal;

a flow selecting step for selecting, from among the first determining flow, the second determining flow, and the third determining flow, a central person determining flow having the shortest the determination processing time obtained by the determination processing time having been estimated in the determination processing time estimating step; and a determining flow executing step for performing central person determining processing on the plurality of image data on the basis of the central person determining flow selected in accordance with the flow selecting step and generating the central person determining result;

the determining flow executing step having:

a face detecting step for performing face detection processing for each of a plurality of images based on the plurality of image data, and outputting a face detection result, and a central person determining processing step for generating the central person determining result by performing central person determining processing on the basis of either the plurality of face image data generated on the basis of the face detection result, or the face detection result and the plurality of image data.

In the central person determining method, it is preferable that the determination processing time estimating step performs the first determining flow, the second determining flow, and the third determining flow for a single piece of image data, calculates respective determination processing actual times, and estimates the determination processing time of each flow on the basis of the determination processing actual times.

In addition, the present invention provides a central person determining program for causing a computer of an information terminal, or an information terminal and a server to execute each step of one of the central person determining methods described above.

Further, the present invention provides a computer-readable recording medium on which has been stored the above-described central person determining program.

According to the invention, it is possible to shorten the determination processing time related to central person determining processing in a low-speed communication environment. According to the invention, it is also possible to select an optimum central person determining flow in accordance with the respective data processing speeds of an information terminal and a server and the communication speed between the information terminal and the server, and to shorten the determination processing time related to central person determining processing.

BRIEF DESCRIPTION OF THE DRAWINGS

FIG. 7 is a flowchart showing an example of a first determining flow pertaining to the second embodiment of the invention.

FIG. 8 is a flowchart showing an example of a second determining flow pertaining to the second embodiment of the invention.

FIG. 9 is a flowchart showing an example of a third determining flow pertaining to the second embodiment of the invention.

FIG. 10 is a flowchart showing an example of the operation of the central person determining system of FIG. 6.

DETAILED DESCRIPTION OF THE INVENTION

A central person determining system pertaining to the invention, and an information terminal, a central person determining method, and a central person determining program and a recording medium used in the central person determining system will be explained in detail below on the basis of the preferred embodiments illustrated in the attached drawings.

(First Embodiment)

Figure 1:
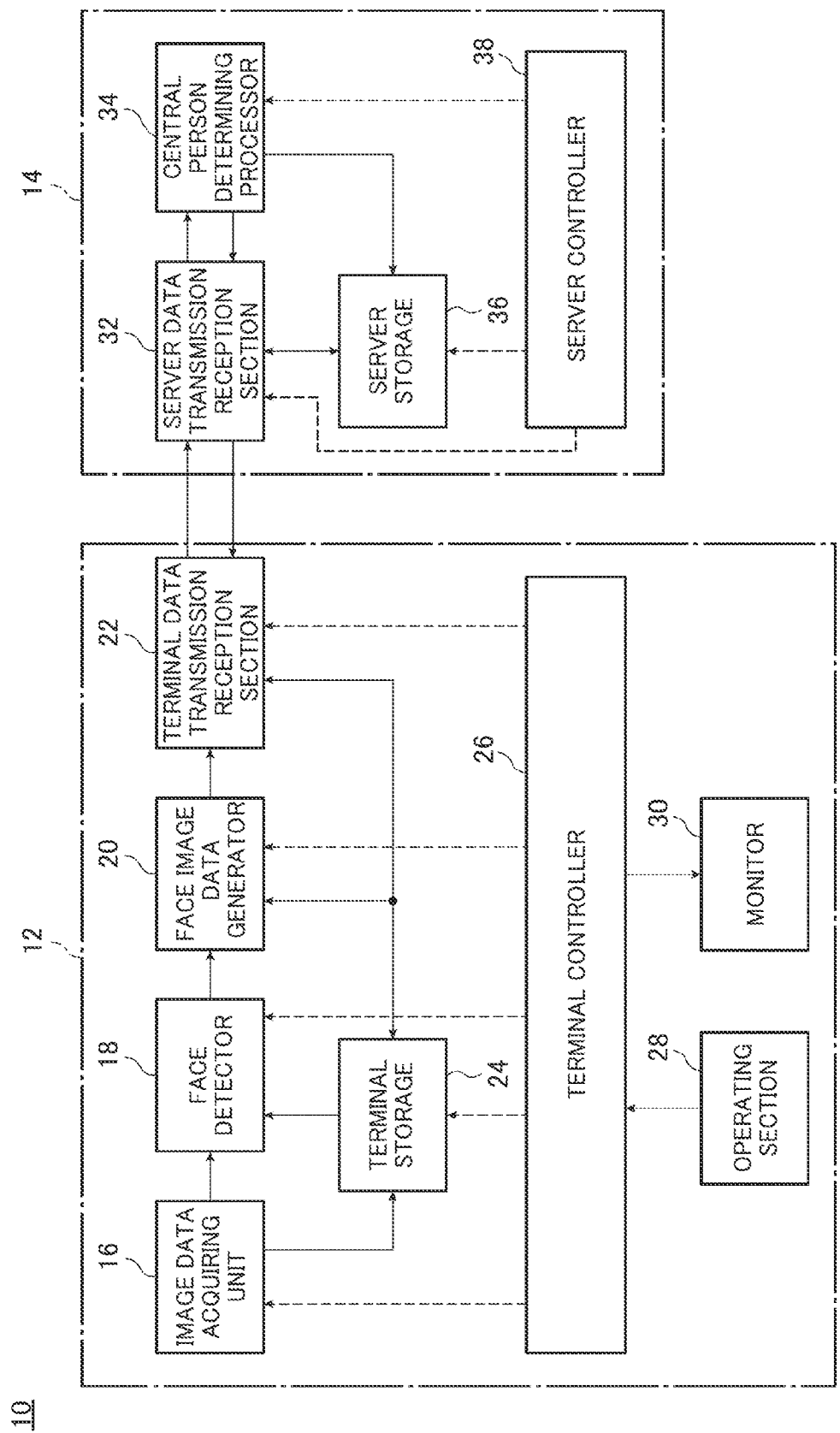
FIG. 1 is a block diagram illustrating the overall configuration of a central person determining system pertaining to a first embodiment of the invention.

FIG. 1 is a block diagram illustrating the overall configuration of a central person determining system pertaining to a first embodiment of the invention. The central person determining system 10 of FIG. 1 is configured using an information terminal 12 and a server 14, and the information terminal 12 and the server 14 are connected to one another by a low-speed communication network such as a 3G network, for example.

The information terminal 12 comprises an image data acquiring unit 16, and a face detector 18, a face image data generator 20, and a terminal data transmission reception section 22, which are connected in sequence from the image data acquiring unit 16, and comprises a terminal storage 24 that is connected to each of these components. The information terminal 12 also comprises a terminal controller 26 that is connected to the image data acquiring unit 16, the face detector 18, the face image data generator 20, the terminal data transmission reception section 22, and the terminal storage 24, respectively, and an operating section 28 and a monitor 30 connected to the terminal controller 26.

The information terminal 12, for example, can be a mobile telephone, a personal digital assistant (PDA), a notebook PC, a tablet PC, a handheld game machine, or other such terminal that is capable of communicating with the server 14 and so forth via the internet or the like.

The server 14 comprises a server data transmission reception section 32, a central person determining processor 34 connected to the server data transmission reception section 32, and a server storage 36 that is connected to the server data transmission reception section 32 and the central person determining processor 34, and also comprises a server controller 38 connected to the server data transmission reception section 32, the central person determining processor 34, and the server storage 36.

Figure 2:
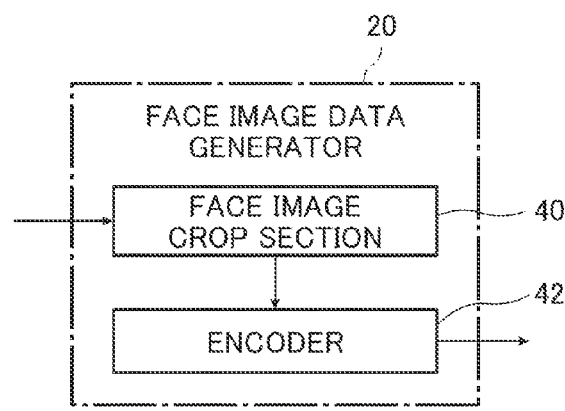
FIG. 2 is a block diagram illustrating an example of the configuration of a face image data generator in the central person determining system of FIG. 1.
Figure 3:
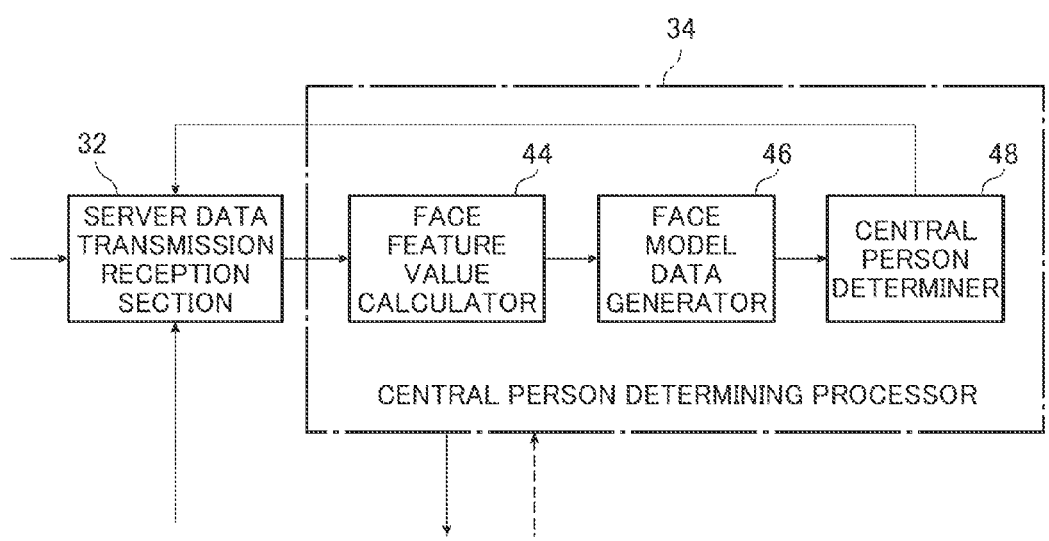
FIG. 3 is a block diagram illustrating an example of the configuration of a central person determining processor in the central person determining system of FIG. 1.

As illustrated in FIG. 2, the face image data generator 20 comprises a face image crop section 40, and an encoder 42 that is connected to the face image crop section 40. As illustrated in FIG. 3, the central person determining processor 34 comprises a face feature value calculator 44, a face model data generator 46, and a central person determiner 48, which are connected in sequence from the server data transmission reception section 32, and the central person determiner 48 is connected to the server data transmission reception section 32.

The image data acquiring unit 16 of the information terminal 12 of FIG. 1 is connected to an external storage device, and is equipped with a recording medium or the like, and acquires a plurality of image data from the storage device and the recording medium and the like, and outputs the acquired plurality of image data.

The face detector 18 acquires the plurality of image data from either the image data acquiring unit 16 or the terminal storage 24, detects a face image appearing in an image (a portion of the face appearing in the image) from an image on the basis of the respective image data, and outputs a face detection result. The detection of a face image is performed, for example, by performing matching using a template on which is recorded information on the luminance distribution of a face, and detecting a face image from among the images on the basis of the eyes, nose, mouth, and face contour, and in accordance with detecting the face image, the respective central coordinates (for example, the pixel coordinates) of the face image, and the size of the face image are outputted as the face detection results. The central coordinates of the face image here are the face image central coordinates calculated based on the eyes, nose, mouth, and face contour, for example, and will differ depending on the orientation of the face, and upon facing forward, for example, the coordinates in the vicinity of the center of the nose are calculated as the central coordinates of the face image, and upon facing sideways, for example, the coordinates in the vicinity of the center of the face contour line are calculated as the central coordinates of the face image. Also, the size of the face image here is, for example, calculated by doubling the distance between the central coordinates of the face image and the jaw part (or the top of the head part) of the face contour line.

The face image data generator 20 generates face image data by extracting the face image portion from the image on the basis of the respective image data, and outputs the face image data.

The face image crop section 40 of FIG. 2 crops (cuts out) respective face images on the basis of the central coordinates of the face image and the size of the face image described above, and generates pre-face image data. The encoder 42 acquires the pre-face image data, and generates face image data by performing encoding so as to support a predetermined standard. The cropping and encoding will be described in detail below.

The terminal data transmission reception section 22 of FIG. 1 transmits and receives various data to and from the server 14 on the basis of a predetermined protocol, for example, the transmission control protocol/internet protocol (TCP/IP), transmits face image data and the like to the server 14, and receives a central person determining result, which will be described below, from the server 14.

The terminal storage 24 stores the aforementioned plurality of image data, the face detection results, and the plurality of face image data and the like, and is configured using a recording medium, such as a magnetic tape, a magnetic disk, an optical disk, a magnetooptical disk, or a flash memory, for example.

The terminal controller 26 is either directly or indirectly connected to each component of the information terminal 12, and controls each component of the information terminal 12 either on the basis of a user instruction from the operating section 28, or on the basis of a predetermined program stored in an internal memory or the like not illustrated in the drawings. The acquisition of image data by the image data acquiring unit 16, the display of an image on the monitor 30, the utilization of a central person determining result, and the like, are performed through the terminal controller 26, for example.

The operating section 28 receives various instructions from a user, and outputs these instructions to the terminal controller 26, and can utilize a variety of well-known configurations, such as various types of buttons, a keyboard, and a mouse, for example. The operating section 28 may also be integrated with the monitor 30 and configured as a touch panel display.

The monitor 30, on the basis of an instruction from the terminal controller 26, displays an image based on either the aforementioned image data or face image data, and an image for operational use, and the like and, for example, can be a liquid crystal display, an organic electroluminescent display, and the like.

The server data transmission reception section 32 of the server 14, in the same manner as the above-described terminal data transmission reception section 22, transmits and receives various data to and from the information terminal 12 on the basis of the predetermined protocol such as the TCP/IP, for example, receives face image data and the like from the information terminal 12, and transmits a same-person determination result or the like to the information terminal 12.

The central person determining processor 34 performs central person determining processing on the basis of a plurality of face image data, and outputs a central person determining result.

The face feature value calculator 44 of FIG. 3 detects, for example, from a face image based on the face image data, the parts of a face, such as the eyes, nose, mouth, and face contour, in the face image, and calculates face parts position information as a face feature value. The feature value of the nose portion of the face image, for example, is calculated as the central coordinates of the nose portion (the pixel coordinates in either the image data or the face image data) (x, y)=(43 px, 122 px) and the size of the nose portion (width, height)=(6 px, 13 px).

The face model data generator 46 generates face model data on the basis of a plurality of face feature values, and outputs the face model data. The face model data can be vector quantities and the like representing the physical relationship of face parts calculated on the basis of the aforementioned face parts position information, for example.

The central person determiner 48 performs same-person determining processing on the basis of the difference between face model data, for example, and outputs a central person determining result that treats the person for whom the face image data is the most numerous as the central person. The central person determining result is not limited to information about the central person alone, and may include information on a person, other than the central person, who has been determined in accordance with same-person determining processing, and, for example, can be a table of the respective people, including the central person, who appear in the images and the number of times these people appear.

The server storage 36 of FIG. 1 stores the aforementioned face detection result, a plurality of face image data, central person determining result, and the like, in the same manner as the above-described terminal storage 24 does, and is configured using a recording medium, such as a magnetic tape, a magnetic disk, an optical disk, a magnetooptical disk, or a flash memory, for example.

The server controller 38, in the same manner as the terminal controller 26 described above, is connected either directly or indirectly to each component of the server 14, and controls each component of the server 14 either on the basis of a user instruction from the information terminal 12, or on the basis of a predetermined program stored in an internal memory or the like not illustrated in the drawings. The transmission and reception of data by the server data transmission reception section 32, central person determining processing in the central person determining processor 34, the search for stored data in the server storage 36, and the like, are performed through the server controller 38.

Next, the operation of the central person determining system 10 of FIG. 1 (the central person determining method of the invention) will be explained on the basis of the flowchart of FIG. 4. The processing times for the information terminal 12 and the server 14 for each step are as shown in Table 1 described above. That is, it is supposed that the information terminal 12 is an information terminal having performance equivalent to that of a SAMSUNG Galaxy S4 SC-04E, and it is supposed that the server 14 is a server having performance equivalent to that of a DELL PowerEdge R420.

In Step S1, the image data acquiring unit 16 of the information terminal 12, on the basis of a user instruction from the operating section 28 via the terminal controller 26, acquires a plurality of image data for performing a central person determination from either an external recording device connected to the image data acquiring unit 16 or a recording medium or the like installed in the image data acquiring unit 16. The plurality of image data acquired by the image data acquiring unit 16 is outputted to the face detector 18. This plurality of image data may also be outputted to the terminal storage 24. The acquisition of a plurality of image data by the image data acquiring unit 16 is optional, and, for example, a plurality of image data that was stored beforehand in the terminal storage 24 may be used.

Next, in Step S2, face detection processing is performed in the face detector 18 for each piece of image data of the plurality of image data. For example, the face detection processing detects a face image from images based on the image data using a well-known face detection algorithm, and outputs the central coordinates of the face image and the size of the face image as face detection results. The face detection results are outputted to the face image data generator 20 together with the image data for which face detection was performed. Upon the faces of a plurality of people appearing in a single image, face detection results proportional to the number of people are outputted.

Next, in Step S3, face image data is generated on the basis of the image data and the face detection results for this image data.

Figure 5:
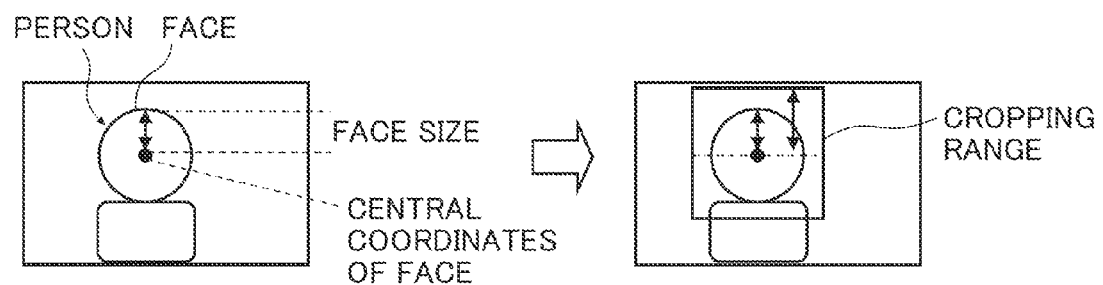
FIG. 5 is a drawing illustrating an example of face image cropping (cutting out) in a face image crop section of the face image data generator of FIG. 2.

First, as Step S3-1, the face image crop section 40 of the face image data generator 20 determines a face image cropping range on the basis of central coordinates of the face image and the face image size outputted as the face detection results, and generates pre-face image data by cropping the face image on the basis of the determined cropping range as illustrated in FIG. 5. The pre-face image data generated by the face image crop section 40 is outputted to the encoder 42. The cropping range can be a square having as its center the central coordinates of the face image, in which the length of one side is 1.5-times the size of the face image, for example. When the face image cropping range is made slightly larger than the detected face image size, it is possible to compensate for the accuracy of the face feature value calculation in the face feature value calculator 44. Furthermore, the cropping range is not limited to the size of the square described above, and, for example, a circle having as its center the central coordinates of the face image may be used as the cropping range, or the shape of the face along the face contour line may be used as the cropping range.

Next, in Step S3-2, the encoder 42 acquires the pre-face image data, and generates face image data by encoding the pre-face image data so as to support a predetermined standard. Because face image sizes will differ in accordance with the size of the original image data, and will affect the transmission of data by the terminal data transmission reception section 22 and the calculation of a face feature value in the face feature value calculator 44, the encoder 42 generates the face image data by performing encoding that supports a predetermined standard in order to facilitate various processing and comparisons. The data volume in the plurality of image data (original image data) will vary, and it is supposed, for example, that the plurality of image data is approximately 80 kB on average (the data volume generally considered to be the size of a VGA image in a JPEG format).

The encoder 42 encodes the pre-face image data such that the sizes of the face images are made uniform (re-sized) so that the face image size is 100 px×100 px, for example, and such that the data volume becomes 5 kB or less.

Upon generating the face image data, the encoder 42 also associates the information so that the original image data of the face image data is made clear, and so that it is clear which face image is the face image appearing in the image (original image) based on the original image data. The information association may be performed by giving a rule-based data name to the face image data upon generating the face image data, such as "(data name of original image data)_(central coordinates of face image x_y)_(size of face).jpg", for example. Specifically, in the case of a face image for which "central coordinates: (x, y)=(200 px, 150 px) (having the lower left end of the original image as the starting point), face image size: 50 px (size of the face image in the original image)", which was cropped from an original image (original image data) labeled "A.jpg", the face image data can be associated with the original image data by using "A_200_150_50.jpg". Furthermore, the association is not limited to the above-described example, and the checksum of the original image data may be used in a filename as the data name of the face image data, or the checksum data itself may be combined with the face image data. The face image data generated by the encoder 42 is outputted to the terminal storage 24.

Next, in Step S4, the terminal controller 26 repeats Step S2 and Step S3 (Steps S3-1 and S3-2) for all of the image data of the plurality of image data until the face image data is generated, checks to make sure that face image data has been generated for all of the image data, and outputs all the face image data stored in the terminal storage 24 to the terminal data transmission reception section 22.

Since 200 ms of processing time is required upon detecting a single face in the face detector 18 of the information terminal 12, for example, 80 seconds (400×200 ms) of processing time is required upon performing face detection for 400 pieces of image data (one image, one face), and 300 seconds (1500×200 ms) of processing time is required upon performing face detection for 1500 pieces of image data (one image, one face). Furthermore, since the generation of face image data in the face image data generator 20 takes, for example, 20 ms per piece of face image data, 8 seconds (400×20 ms) of processing time is required upon generating face image data from 400 pieces of image data (one image, one face), and 30 seconds (1500×20 ms) of processing time is required when generating face image data from 1500 pieces of image data (one image, one face). That is, it takes 88 seconds to generate 400 pieces of face image data from 400 pieces of image data, and it takes 330 seconds to generate 1500 pieces of face image data from 1500 pieces of image data.

Next, in Step S5, the terminal data transmission reception section 22 transmits (uploads) the plurality of face image data to the server 14. The information terminal 12 and the server 14, as was described above, are connected to one another via the internet using a low-speed 3G network (effective upload speed of 0.7 Mbps, for example).

Furthermore, upon approximately 5 kB of the volume of data in the face image data, as was described above, the time required to transmit 400 pieces of face image data (approximately 2 MB: 5 kB×400) and 1500 pieces of face image data (approximately 7.5 MB: 5 kB×1500) from the information terminal 12 to the server 14, for example, is as shown in Table 3 below.

TABLE 3

| Communication Environment | Effective Upload Speed (Mbps) | Face Image Data | |
|---|---|---|---|
| | | 400 pieces 2 MB | 1500 pieces 7.5 MB |
| 3G | 0.7 | 22.9 seconds | 85.7 seconds |

The server 14 receives the plurality of image data transmitted from the terminal data transmission reception section 22 of the information terminal 12 in the server data transmission reception section 32, and next, in Step S6, generates a central person determining result by performing central person determining processing in the central person determining processor 34 on the basis of the plurality of face image data.

First, in Step S6-1, the face feature value calculator 44 of the central person determining processor 34 calculates the face feature value for each of the plurality of face image data, and outputs the face feature values to the face model data generator 46. As used here, the face feature value refers to information on the position, size, or shape of parts of the face, such as the eyes (outer corner of the eye, inner corner of the eye, and the like), nose (size, shape, and the like), mouth (corners of the mouth, or the like), and face contour, and the like, for example.

Since processing time takes 16 ms upon calculating a face feature value from one piece of face image data in the face feature value calculator 44 of the server 14, for example, upon calculating the respective face feature values for 400 pieces of face image data, processing time takes 6.4 seconds (400×16 ms), and upon calculating the respective face feature values for 1500 pieces of face image data, processing time takes 24 seconds (1500×16 ms).

Next, in Step S6-2, the face model data generator 46 generates face model data corresponding to the respective face image data on the basis of the face feature values calculated by the face feature value calculator 44, and outputs the face model data to the central person determiner 48. The face model data can be vector quantities representing the physical relationship of the parts of the face, for example.

Processing time takes 0.4 ms upon generating one piece of face model data from one face feature value in the face model data generator 46 of the server 14, for example. Therefore, upon generating the respective face model data from the face feature value of each of 400 pieces of face image data, processing time takes 0.16 seconds (400×0.4 ms), and upon generating the respective face model data from the face feature value of each of 1500 pieces of face image data, processing time takes 0.6 seconds (1500×0.4 ms).

Next, in Step S6-3, the central person determiner 48 compares the face model data with each other which is generated by the face model data generator 46, classifies the face image data into a plurality of groups for each same-person by calculating similarities between the face model data (same-person determination), determines the person having the most numerous face image data (that is, the person who appears the most times) as the central person, and generates central person determining results. The central person determining result generated by the central person determiner 48 is outputted to the server data transmission reception section 32. The central person determiner 48 not only outputs as the central person determining result the information of the face image data by which the central person has been determined as described above, for example, but may also output information about the people (classified groups) that correspond to the face image data, for example, as CVS formatted text data as shown in Table 4 below.

TABLE 4

| Face Image Data Name | Group (Person) Number |
|---|---|
| A_200_150_50.jpg | 1 |
| B_100_130_250.jpg | 1 |
| B_330_240_420.jpg | 2 |
| ... | ... |

Upon determining the central person in the central person determiner 48 of the server 14 on the basis of the face model data of each of the plurality of face image data, since processing time takes 0.01 seconds per face upon 2000 faces or less, for example, upon determining the central person on the basis of the face model data of each of 400 pieces of face image data, the processing time takes 4 seconds (0.01 s×400), and upon generating respective face model data from each face feature value of 1500 pieces of face image data, the processing time takes 15 seconds (0.01 s×1500).

Next, in Step S7, the server data transmission reception section 32 transmits the central person determining results to the information terminal 12. Actually, the server data transmission reception section 32 receives a central person determining result request from the information terminal 12, and transmits the central person determining results to the information terminal 12 in accordance with an instruction of the server controller 38 based on the request. The data volume in the central person determining results will differ depending on the number of pieces of face image data, and as was described above, because the results are text data, the data volume is smaller than the face image data and/or the image data, being approximately 5 kB for 400 images and approximately 19 kB for 1500 images. Accordingly, since the time required for transmission is approximately 0.06 seconds for 400 images and approximately 0.22 seconds for 1500 image, for example, even in a 3G network (effective speed of 0.7 Mbps, for example), the transmission time is extremely less than upon transmitting either image data or face image data. Furthermore, generally speaking, the download speed is faster than the upload speed of the communication speed of a 3G network or the like, and upon the effective upload speed being 0.7 Mbps, downloads can be considered to be more than two times faster than that. Therefore, the transmission time actually required is considered to be even less than the example described above.

Lastly, in Step S8, the terminal data transmission reception section 22 of the information terminal 12 receives the central person determining results transmitted from the server 14. The central person determining results that were received in the terminal data transmission reception section 22 may be outputted to the terminal storage 24 and stored in the terminal storage 24, or may be outputted to the terminal controller 26 and used in various image processing and/or in an image display on the monitor 30. The central person determining results, as shown in Table 4 described above, include not only information as to which people appear in the original image, but also information on the arrangement of the people (face images), and therefore can be used in an image layout upon creating an image product or the like.

Table 5 below consolidates the central person determination processing times according to the central person determining system 10 of the first embodiment of the invention described above, the central person determination processing times upon a plurality of image data held by an information terminal being all transmitted to a server and central person determining processing being performed in the server (Conventional Art 1), and the central person determination processing times upon central person determining processing being performed in the information terminal (Conventional Art 2). Because the time it takes to transmit the central person determining results to the information terminal 12 is extremely short, as was described above, this transmission time will be omitted.

As shown in Table 5 below, the central person determination processing time of the invention is clearly the shortest whether there are 400 pieces of image data or 1500 pieces of image data.

Thus, according to the central person determining system 10 pertaining to the first embodiment of the invention, it is possible to shorten the determination processing time related to central person determining processing in a low-speed communication environment such as a 3G network. Furthermore, the larger the number of pieces of image data on which central person determining processing is performed, the greater the effect of shortening the determination processing time in accordance with the invention.

TABLE 5

| | Processing Time Corresponding to Number of Images (One Image, One Face) (seconds) | | | | | |
|---|---|---|---|---|---|---|
| | 400 images | | | 1500 images | | |
| Processing | The invention 3G Network | Conventional Art 1 3G Network | Conventional Art 2 | The invention 3G Network | Conventional Art 1 3G Network | Conventional Art 2 |
| Original Image Upload | — | 366 | — | — | 1371 | — |
| Face Detection | 80 | 16 | 80 | 300 | 60 | 300 |
| Face Image Generation (Re-size & Encode) | 8 | — | — | 30 | — | — |
| Face Image Upload | 23 | — | — | 86 | — | — |
| Face Feature Value Calculation (Detection of Parts of Face) | 16 | 16 | 80 | 60 | 60 | 300 |
| Face Model Data Generation | 0.4 | 0.4 | 2 | 1.5 | 1.5 | 7.5 |
| Central Person Determination | 4 | 4 | 45 | 15 | 15 | 170 |
| Total Processing Time | 131.5 | 402.5 | 207 | 492.7 | 1507.7 | 777.5 |

(Embodiment 2)

The central person determining system of the invention is not limited to the first embodiment described above, and, for example, the optimum central person determining flow may be selected in accordance with the respective data processing speeds (data processing times) of the information terminal and the server, and the communication speed (communication processing time) between the information terminal and the server, and may perform central person determining processing on the basis of the selected central person determining flow.

Figure 6:
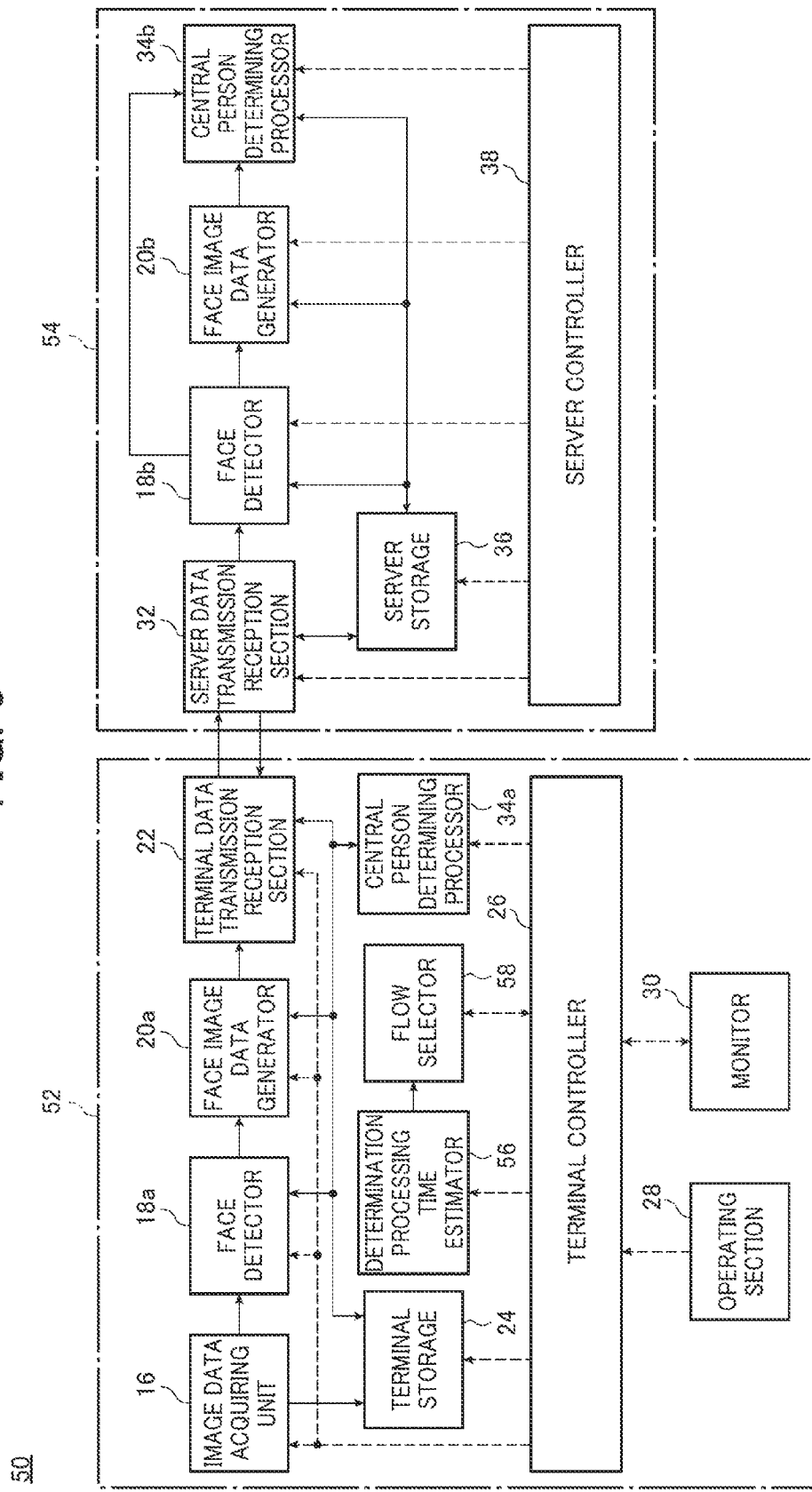
FIG. 6 is a block diagram illustrating the overall configuration of a central person determining system pertaining to a second embodiment of the invention.

FIG. 6 is a block diagram illustrating the overall configuration of a central person determining system pertaining to a second embodiment of the invention. A central person determining system 50 of FIG. 6 is configured using an information terminal 52 and a server 54.

The information terminal 52 comprises an image data acquiring unit 16, and a face detector 18a, a face image data generator 20a, a terminal data transmission reception section 22, and a central person determining processor 34a, which are connected in sequence from the image data acquiring unit 16, and comprises a terminal storage 24 that is connected to these components. The information terminal 52 also comprises a determination processing time estimator 56, a flow selector 58, which is connected to the determination processing time estimator 56, an operating section 28 and a monitor 30, and comprises a terminal controller 26 that is connected to each these components.

The server 54 comprises a server data transmission reception section 32, and a face detector 18b, a face image data generator 20b, and a central person determining processor 34b, which are connected in sequence from the server data transmission reception section 32, comprises a server storage 36 that is connected to each of these components, and comprises a server controller 38 that is connected to each of the server data transmission reception section 32, the face detector 18b, the face image data generator 20b, the central person determining processor 34b, and the server storage 36. The face detector 18b is connected to the central person determining processor 34b.

The same reference symbols are given to components in the information terminal 52 and the server 54 that are the same as those in the information terminal 12 and the server 14 of FIG. 1, and explanations thereof will be omitted. Furthermore, the face detectors 18a and 18b in the information terminal 52 and the server 54 have the same configuration as the face detector 18 of the information terminal 12 of FIG. 1, the face image data generators 20a and 20b have the same configuration as the face image data generator 18 of the information terminal 12 of FIG. 1, and the central person determining processors 34a and 34b have the same configuration as the central person determining processor 34 of the server 14 of FIG. 1. Although the components are the same, upon different handled data or different parts of processing, an explanation to that effect will be provided.

The image data acquiring unit 16, the face detector 18a, the face image data generator 20a, the terminal data transmission reception section 22, the terminal storage 24, the operating section 28, and the monitor 30 of the information terminal 52 of the second embodiment are the same as each of the corresponding components of the information terminal 12 of the first embodiment with the exception that the terminal storage 24 is connected to the central person determining processor 34a. The central person determining processor 34a of the information terminal 52 comprises the same configuration as the central person determining processor 34 of the server 14 of the first embodiment, but differs from the central person determining processor 34 of the server 14, which performs central person determining processing on the basis of the face detection results by the face detector 18 and the face image data generated by the face image data generator 20, in that central person determining processing is performed on the basis of a plurality of image data and the face detection results by the face detector 18a.

The determination processing time estimator 56, in accordance with a communication environment of the information terminal 52 and the data processing speeds of the information terminal 52 and the server 54, estimates the determination processing time required for each of three types of central person determining flows, which will be described below. The estimation of a determination processing time will also be described in detail below. The communication environment, for example, may include the case of the above-described low-speed 3G network and a case in which a high-speed mobile communication system called Long Term Evolution (LTE) (hereinafter LTE network) is used (effective upload speed of 8.4 Mbps, for example).

The flow selector 58 selects, on the basis of the aforementioned determination processing time, any one type of central person determining flow from among the aforementioned three types of central person determining flows. Specifically, the flow selector 58 selects the central person determining flow with the shortest determination processing time of the three types of central person determining flows.

The server 54 has a server data transmission reception section 32 and a central person determining processor 34b in the same manner as the server 14 of FIG. 1, and comprises a face detector 18b and a face image data generator 20b, which are connected in sequence between the server data transmission reception section 32 and the central person determining processor 34b. The face detector 18b of the server 54 is connected to the face image data generator 20b, and is also connected to the central person determining processor 34b, and the face image data generator 20b is connected to the central person determining processor 34b. The face detector 18b is connected to the central person determining processor 34b, and a server storage 36 is connected to the face detector 18b and the face image data generator 20b in addition to the server data transmission reception section 32 and the central person determining processor 34b. A server controller 38 is connected to each of the server data transmission reception section 32, the face detector 18b, the face image data generator 20b, the central person determining processor 34b, and the server storage 36.

(First Determining Flow)

Figure 4:
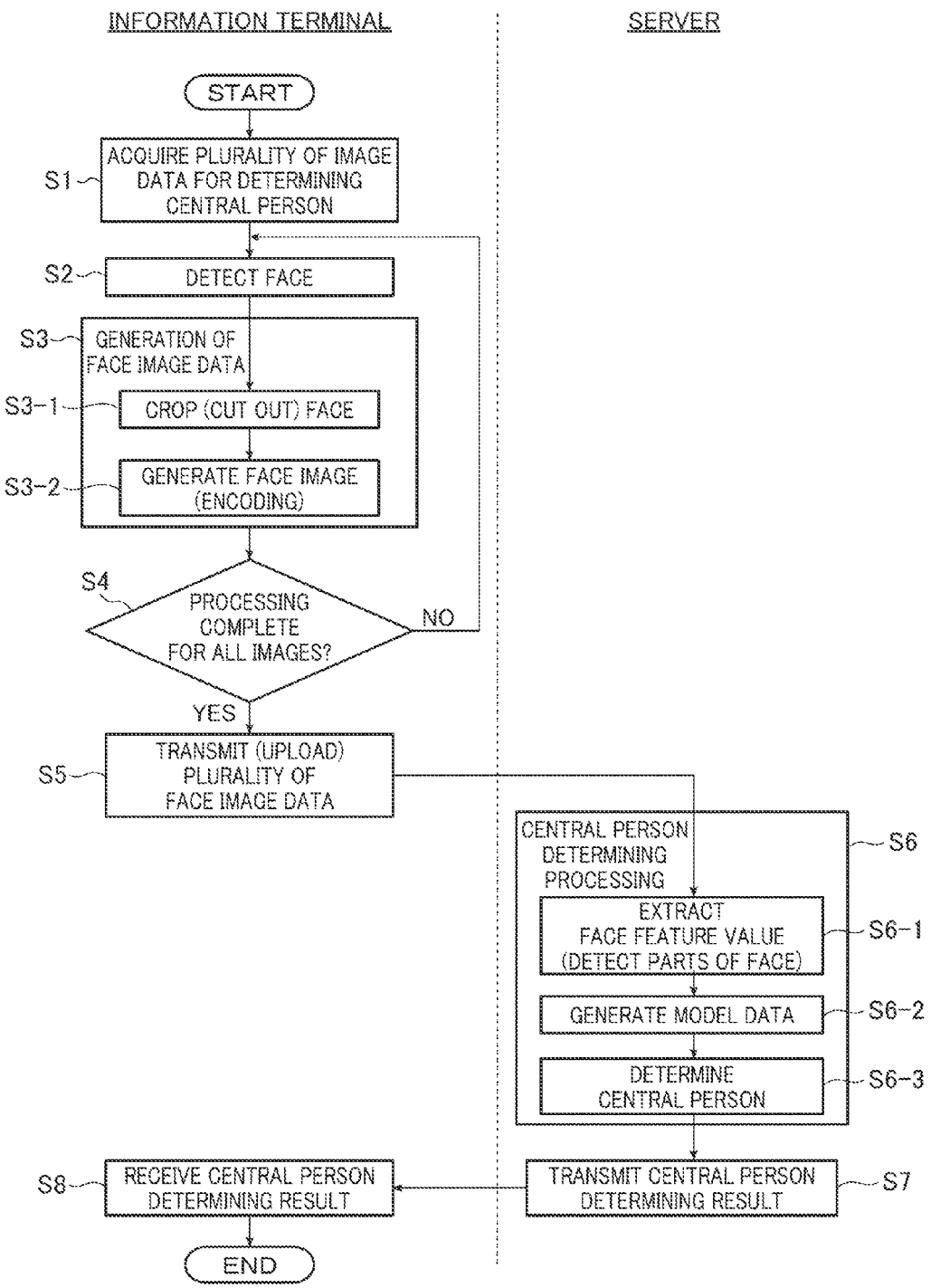
FIG. 4 is a flowchart showing an example of the operation of the central person determining system of FIG. 1

Of the three types of central person determining flows, a first determining flow is the same as Step 2 and beyond of the flow in FIG. 4, and as illustrated in FIG. 7, comprises detecting a face in accordance with the face detector 18 of the information terminal 52 (Step S2), generating face image data in accordance with the face image data generator 20 (Step S3), confirming the generation of the face image data in accordance with the terminal controller 26 (Step S4), transmitting a plurality of image face data in accordance with the terminal data transmission reception section 22 (Step S5), processing a central person determination on the basis of the face image data in accordance with the central person determining processor 34 of the server 54 (Step S6), transmitting a central person determining result in accordance with the server data transmission reception section 32 (Step S7), and receiving the central person determining result in accordance with the terminal data transmission reception section 22 of the information terminal (Step S8).

(Second Determining Flow)

A second determining flow, as illustrated in FIG. 8, comprises transmitting a plurality of image data in accordance with the terminal data transmission reception section 22 of the information terminal 52 (Step S9), detecting a face in accordance with the face detector 18 of the server 54 (Step S2), processing a central person determination on the basis of face detection results and the plurality of image data in accordance with the central person determining processor 34 of the server 54 (Step S6), transmitting a central person determining result in accordance with the server data transmission reception section 32 (Step S7), and receiving the central person determining result in accordance with the terminal data transmission reception section 22 of the information terminal (Step S8).

Processing of the central person determination in the second determining flow differs from that of the first determining flow, and is central person determining processing based on image data rather than central person determining processing that is based on face image data. Accordingly, the generation of face image data is not necessary in the second determining flow.

(Third Determining Flow)

A third determining flow, as illustrated in FIG. 9, is performed solely by the information terminal 52, and comprises detecting a face in accordance with the face detector 18 of the information terminal 52 (Step S2), and processing a central person determination on the basis of the face detection results and the plurality of image data in accordance with the central person determining processor 34 of the information terminal 52 (Step S6).

Note that as in the second determining flow, processing of the central person determination in the third determining flow is central person determining processing based on image data rather than central person determining processing that is based on face image data. Accordingly, the generation of face image data is not necessary in the third determining flow.

Next, the operation of the central person determining system 50 of FIG. 6 (the central person determining method of the invention) will be explained on the basis of the flowchart of FIG. 10.

As illustrated in Step S1, the image data acquiring unit 16 of the information terminal 52, on the basis of a user instruction from the operating section 28 via the terminal controller 26, acquires a plurality of image data for performing a central person determination from either an external recording device connected to the image data acquiring unit 16 or a recording medium installed in the image data acquiring unit 16, as with the first embodiment. The acquisition of the plurality of image data by the image data acquiring unit 16 is optional, and, for example, a plurality of image data that was stored beforehand in the terminal storage 24 may be used.

At this point, the image data acquiring unit 16 acquires 100 pieces of image data (VGA size, average 80 kB, one image on average equals 1.5 faces) as the plurality of image data, for example. The processing time for each step in the information terminal 52 and the server 54 is the same as in the first embodiment as shown in Table 1 described above.

Next, in Step S10, the terminal controller 26 controls the determination processing time estimator 56, and respectively estimates the determination processing times of central person determining processing required by each of the first determining flow, the second determining flow, and the third determining flow.

The determination processing time will differ in accordance with either the data processing speeds of the information terminal 52 and the server 54, or the communication speed (communication environment) between the information terminal 52 and the server 54, but the determination processing time estimator 56 respectively performs central person determining processing for a single piece of image data using the first determining flow, the second determining flow, and the third determining flow, for example, calculates the actual time for each determination processing, and estimates the determination processing time on the basis of the determination processing times required for one piece of data and the number of pieces of image data. The transmission time for the central person determining result is the same as in the first embodiment, and will be omitted for this reason.

Since there is no proportional relationship between the processing time and the number of faces (number of pieces of face model data) in the determination of the central person, as shown in Table 6 below, for example, a table for computing an expected processing time relative to the number of faces may be prepared, and a formula for calculating a prediction value of a processing time relative to the number of faces may be prepared.

There is no way of actually knowing the number of faces without performing face detection processing, and therefore the number of faces included per image may be calculated from past statistics and a prediction of the total number of faces may be made based thereon, for example, and a plurality of patterns may be prepared upon, on average, one face appearing in an image, two faces appearing in an image, and three faces appearing in an image, and a processing time may be calculated for each pattern.

TABLE 6

Central Person Determination

| | Computation Formula | |
|---|---|---|
| Number of Faces | Information Terminal | Server |
| Less than 2000 faces | 0.1 seconds × number of faces | 0.01 seconds × number of faces |
| From 2000 faces to 4000 faces | 0.2 seconds × number of faces | 0.02 seconds × number of faces |
| 4000 faces or more | . . . | . . . |
| . . . | . . . | . . . |

In the case of the first determining flow, the determination processing time is expressed by Formula (1) below.

(Face Detection Time)×Number of Faces+(Number of Faces×Average Face Image File Size)/(Upload Communication Speed)+(Face Feature Value Calculation Time+Face Model Data Generation Time)×Number of Faces+(Central Person Determination Time)     (1)

Upon 150 pieces of the number of faces, 5 kB/face image of the face image file size, and (0.01 seconds (10 ms))×the number of faces of the central person determination time in the server 54 as in Table 6 here, Formula (1) becomes:

200 ms×150+(150×5 kB)/Upload Communication Speed+41 ms×150+10 ms×150=750 kB/Upload Communication Speed+37.7 (s).

Upon the effective upload communication speed being respectively estimated in the case of a 3G network (0.7 Mbps) and the case of a LTE network (8.4 Mbps), for example, in the case of the 3G network, Formula (1) becomes:

750 kB/0.7 Mbps=750×8/0.7×1000=8.6 (s)

and in the case of the LTE network, becomes:

750 kB/8.4 Mbps=750×8/8.4×1000=0.7 (s).

From the above, the determination processing time estimator 56 estimates the determination processing time in accordance with the first determining flow as 46.3 seconds in the case of the 3G network, and as 38.4 seconds in the case of the LTE network.

In the case of the second determining flow, the determination processing time is expressed by Formula (2) below.

(Original Number of Images×Average Data Size)/(Upload Communication Speed)+(Face Detection Time+Face Feature Value Calculation Time+Face Model Data Generation Time)×Number of Faces+(Central Person Determination Time)   (2)

Upon the number of images representing the image data (VGA size, average 80 kB) being 100, the number of faces being 150, and the central person determination time in the server 54 being (0.01 seconds)×the number of faces as in Table 6 here, Formula (2) becomes:

(100×80 kB)/Upload Communication Speed+81 ms×150+10 ms×150=8000 kB/Upload Communication Speed+13.7 (s).

Upon the effective upload communication speed being respectively estimated in the case of a 3G network (0.7 Mbps) and the case of a LTE network (8.4 Mbps), for example, in the case of the 3G network, Formula (2) becomes:

8000 kB/0.7 Mbps=8000×8/0.7×1000=91.4 (s)

and in the case of the LTE network, becomes:

8000 kB/8.4 Mbps=8000×8/8.4×1000=7.6 (s).

From the above, the determination processing time estimator 56 estimates the determination processing time in accordance with the second determining flow as 105.1 seconds in the case of the 3G network, and as 21.3 seconds in the case of the LTE network.

In the case of the third determining flow, the determination processing time is expressed by Formula (3) below.

(Face Detection Time+Face Feature Value Calculation Time+Face Model Data Generation Time)×Number of Faces+(Central Person Determination Time)   (3)

Upon the number of faces being 150, and the central person determination time in the information terminal 52 being 0.1 seconds (100 ms)×the number of faces as in Table 6 here, Formula (3) becomes:

405 ms×150+100 ms×150=75.8 (s).

From the above, the determination processing time estimator 56 estimates the determination processing time in accordance with the third determining flow as 75.8 seconds.

As Step S11, the flow selector 58 selects the flow with the shortest processing time from among the respective determination processing times estimated by the determination processing time estimator 56, and outputs the selected flow information to the terminal controller 26.

As described above, upon there being 100 images and 150 faces, the flow selector 58 selects the first determining flow in a case where the information terminal 52 is connected to a 3G network, and selects the second determining flow in a case where the information terminal 52 is connected to an LTE network.

Lastly, as Step S12, the terminal controller 26 performs central person determining processing for the plurality of pieces of image data and acquires central person determination results by controlling the information terminal 52 and the server 54 or each component of the information terminal 52 on the basis of the determining flow selected by the flow selector 58.

As described above, according to the central person determining system 50 pertaining to the second embodiment of the invention, the optimum central person determining processing flow can be selected on the basis of the communication environment and the data processing speeds of the information terminal and the server, making it possible to reduce the determination processing time related to the central person determination process.

Central person determining processing in the invention is not limited to the sequential flow described above as face detection, face feature value calculation (detection of parts of the face), face model data generation, and central person determination (same-person determination), and can make use of a variety of well-known central person determination processes and same-person determination processes.

Furthermore, it is supposed that the information terminal has a slow data processing speed, for example, that it is an information terminal for which the time required from face detection to face model data generation is 300 ms or more (the above-described SAMSUNG Galaxy S4 SC-04E, for example), and it is supposed that the server has a fast data processing speed, for example, that it is a server for which the time required from face detection to face model data generation is less than 300 ms (the above-described DELL PowerEdge R420, for example), but the data processing speeds of information terminals and servers are improving in accordance with advances in technology, and are not limited to these speeds.

As the communication speed, a 3G network or lower communication speed is given as the slow speed, and an LTE network or higher communication speed is given as the fast speed, but depending on the communication environment, there may be cases where the communication speeds are not achieved even in a LTE network, and therefore, a case in which the effective speeds are 3.6 Mbps for the upload and 7.2 Mbps for the download or less may be used as the slow speed, and a case in excess thereof may be used as the fast speed, for example. Furthermore, in the same manner as the data processing speeds described above, communication speeds are improving in accordance with advances in technology, and are not limited to these speeds.

The above-described central person determining method of the invention can be processed in either the information terminal or in the information terminal and the server in accordance with executing a central person determining program. For example, the central person determining program of the invention has procedures that cause either the information terminal, or the information terminal and the server, specifically, the CPUs thereof to perform the respective steps of the central person determining flows described above. The program comprising this procedures may be configured as either one or a plurality of program modules.

The central person determining program comprising these procedures, which are executed by either the information terminal or the information terminal and the server, may be stored in an internal memory (not illustrated) of either the information terminal or the information terminal and the server, and/or may be stored in a recording medium, and may be executed by being read from either the internal memory or the recording medium by the CPU and the like at the time of execution.

Therefore, the invention may be a computer-readable memory or a recording medium on which has been stored the central person determining program for executing the above-described central person determining method on either the information terminal or the information terminal and the server.

The central person determining system, central person determining method, and central person determining program and the recording medium of the invention have been described in detail above, but the invention is not limited to the aforementioned embodiments, and various improvements and changes may be made without departing from the scope of the invention.

What is claimed is:

1. A central person determining system including an information terminal having a plurality of image data, or the information terminal and a server, the central person determining system comprising:
   a determination processing time estimator configured to estimate a determination processing time required for central person determining processing on the basis of the plurality of image data, in accordance with a communication speed between the information terminal and the server and respective data processing speeds of the information terminal and the server, in each of a first determining flow for performing central person determining processing by generating face image data from the plurality of image data in the information terminal and transmitting the face image data to the server and receiving a central person determining result from the server; a second determining flow for performing central person determining processing by transmitting the plurality of image data from the information terminal to the server, and receiving a central person determining result from the server; and a third determining flow for performing central person determining processing based on the plurality of image data and generate a central person determining result in the information terminal;
   a flow selector for selecting, from among the first determining flow, the second determining flow, and the third determining flow, a central person determining flow having the shortest the determination processing time obtained by the determination processing time having been estimated in the determination processing time estimator; and
   a determining flow executing section configured to perform central person determining processing on the plurality of image data on the basis of the central person determining flow selected by the flow selector;
   the determining flow executing section including:
      a face detector configured to perform face detection processing for each of a plurality of images based on the plurality of image data, and outputting a face detection result; and
      a central person determining processor configured to perform central person determining processing on the basis of either the plurality of face image data generated on the basis of the face detection result, or the face detection result and the plurality of image data, and generate the central person determining result.

2. The central person determining system according to claim 1, wherein the determination processing time estimator performs each of the first determining flow, the second determining flow, and the third determining flow for a single piece of image data in the determining flow executing section, calculates respective determination processing actual times, and estimates the determination processing time of each flow on the basis of the calculated determination processing actual times.

3. An information terminal that has a plurality of image data, comprising:
   a determination processing time estimator configured to estimate a determination processing time required for central person determining processing on the basis of the plurality of image data, in accordance with a communication speed between the information terminal and a server and respective data processing speeds of the information terminal and the server, in each of a first determining flow for performing central person determining processing by generating face image data from the plurality of image data in the information terminal and transmitting the face image data to the server, and receiving a central person determining result from the server; a second determining flow for performing central person determining processing by transmitting the plurality of image data from the information terminal to the server, and receiving a central person determining result from the server; and a third determining flow for performing central person determining processing based on the plurality of image data and generating a central person determining result in the information terminal; and
   a flow selector for selecting, from among the first determining flow, the second determining flow, and the third determining flow, a central person determining flow having the shortest the determination processing time obtained by the determination processing time having been estimated in the determination processing time estimator.

4. A central person determining method used with an information terminal that has a plurality of image data, or with the information terminal and a server, comprising:
   a determination processing time estimating step for estimating a determination processing time required for central person determining processing on the basis of the plurality of image data, in accordance with a communication speed between the information terminal and the server and respective data processing speeds of the information terminal and the server in the information terminal, in each of a first determining flow for performing central person determining processing by generating face image data from the plurality of image data in the information terminal and transmitting the face image data to the server and receiving a central person determining result from the server; a second determining flow for performing central person determining processing by transmitting the plurality of image data from the information terminal to the server, and receiving a central person determining result from the server; and a third determining flow for performing central person determining processing based on the plurality of image data and generating a central person determining result in the information terminal;
   a flow selecting step for selecting, from among the first determining flow, the second determining flow, and the third determining flow, a central person determining flow having the shortest the determination processing time obtained by the determination processing time having been estimated in the determination processing time estimating step; and
   a determining flow executing step for performing central person determining processing on the plurality of image data on the basis of the central person determining flow selected in accordance with the flow selecting step and generating the central person determining result;

the determining flow executing step having:
- a face detecting step for performing face detection processing for each of a plurality of images based on the plurality of image data, and outputting a face detection result, and
- a central person determining processing step for generating the central person determining result by performing central person determining processing on the basis of either the plurality of face image data generated on the basis of the face detection result, or the face detection result and the plurality of image data.

5. The central person determining method according to claim 4, wherein the determination processing time estimating step performs the first determining flow, the second determining flow, and the third determining flow for a single piece of image data, calculates respective determination processing actual times, and estimates the determination processing time of each flow on the basis of the determination processing actual times.

6. A non-transitory computer-readable recording medium on which has been stored a central person determining program for causing a computer of an information terminal, or an information terminal and a server to execute each step of the central person determining method described in claim 4.

* * * * *